United States Patent [19]

Friedman

[11] 3,897,559

[45] July 29, 1975

[54] ANTHELMINTIC PHENYLHYDRAZONES

[75] Inventor: Henry Friedman, Indianapolis, Ind.

[73] Assignee: Eli Lilly and Company, Indianapolis, Ind.

[22] Filed: Mar. 18, 1974

[21] Appl. No.: 452,027

Related U.S. Application Data

[62] Division of Ser. No. 269,338, July 6, 1972, Pat. No. 3,824,233.

[52] U.S. Cl. ................. 424/275; 424/282; 424/327
[51] Int. Cl. ............................................. A61k 27/00
[58] Field of Search ............ 424/275, 327, 304, 282

[56] References Cited
UNITED STATES PATENTS

| | | | |
|---|---|---|---|
| 3,721,740 | 3/1973 | Folz | 424/327 |
| 3,721,742 | 3/1973 | Folz | 424/327 |
| 3,745,215 | 7/1973 | Kaugars | 260/569 |

*Primary Examiner*—V. D. Turner
*Attorney, Agent, or Firm*—Joseph A. Jones; Everet F. Smith

[57] ABSTRACT

A class of cinnamoyl and thiopheneacryloyl chloride phenylhydrazones, which are new compounds to the organic chemical art, are effective in the treatment of helminthiasis in domestic and companion animals. The compounds may be substituted on either or both of their rings. The compounds are particularly effective against helminths of the economically-important ruminant animals.

12 Claims, No Drawings

ANTHELMINTIC PHENYLHYDRAZONES

This is a division, of application Ser. No. 269,338, filed July 6, 1972, now U.S. Pat. No. 3,824,233.

BACKGROUND OF THE INVENTION

Helminthiasis is a very common infection by worm-like parasites, known generally as helminths, which afflicts all species of animals.

The helminths considered herein belong to many genera. Many helminths infect various animals. For example, *Haemonchus contortus* infects all of the ruminant animals.

The life cycle of some helminths is simple: egg-laying adults inhabit the digestive tract of the host animal, the eggs are passed out of the host in the feces, and eggs or larvae are ingested, as from pasture forage, by other host animals which become infected. Other helminths, such as *Moniezia expansa*, a tapeworm infecting ruminant animals, have a more complex life cycle. The eggs of that tapeworm are passed from the host animal in the feces. An oribatid mite makes a hole in the eggshell and ingests the contents. The oncosphere of the helminth develops in the digestive tract of the mite, passes through the gut wall to the body cavity of the mite, and forms a tiny cyst. New ruminant animal hosts are infected by ingestion of the mites, which inhabit vegetation which the ruminants eat.

The spread of helminth infection from one host animal to another is extremely ready and insidious. The various life cycles of the different helminths allow the spread of helminth eggs and larvae in a variety of different ways, many of them unexpected to the grower.

A typical case of helminthiasis does not kill the host. Usually the host animal loses weight and becomes unthrifty and inefficient in its feed utilization. After a period of severe helminthiasis, the host animal usually becomes partially immune or spontaneously throws off the helminth infection. Eventually the animal regains its normal health, but does not recover the growth which it lost during the period of infection.

Many if not most domestic and companion animals are more or less infected with helminths at all times. The infection may be of such a low level as to be harmless. The infection may also be of a harmful level but insufficient to be recognized by the grower. Such infections cause small constant losses in growth and feed efficiency.

There are few effective ways to prevent or treat helminth infections. One useful drug is phenothiazine, which is often fed in the animals' salt ration. Carbon tetrachloride and hexachloroethane are used to clear animals of digestive tract helminths. Avoidance of premises known to be infected with helminth eggs is frequently useful, if the premises are left clear for a time long enough to allow the eggs to die.

New anthelmintic drugs continue to be tested. For example, British Pat. No. 1,254,585 (1971) disclosed a class of benzoyl choride phenylhydrazones which were said to have activity against a range of helminths.

SUMMARY

I have discovered and now disclose a class of cinnamoyl and thiopheneacryloyl chloride phenylhydrazones which have anthelmintic activity in domestic and companion animals. My novel compounds, which may be substituted on either or both rings, are particularly effective against the helminths of ruminant animals, but are effective in treating other economically important species as well. I have also discovered anthelmintic methods which make use of my new compounds, and anthelmintic compositions, for administration to domestic and companion animals, which contain my new anthelmintic compounds.

DESCRIPTION OF THE PREFERRED EMBODIMENT

The novel phenylhydrazones which I have discovered to have useful anthelmintic activity are of the formula

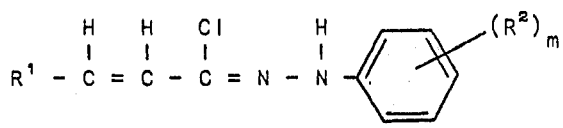

wherein
$R^1$ represents

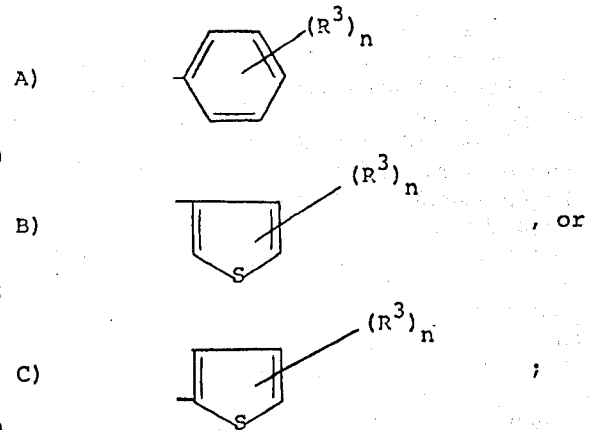

$R^2$ represents
  A. $C_1$-$C_3$ alkyl,
  B. $C_1$-$C_3$ alkoxy,
  C. chloro,
  D. bromo,
  E. iodo,
  F. trifluoromethyl,
  G. cyano, or
  H. two $R^2$ groups attached to adjacent carbon atoms of the phenyl ring represent methylenedioxy;
$R^3$ represents
  A. $C_1$-$C_3$ alkyl,
  B. $C_1$-$C_3$ alkoxy,
  C. chloro,
  D. bromo,
  E. iodo,
  F. trifluoromethyl,
  G. cyano,
  H. nitro, or
  I. two $R^3$ groups attached to adjacent carbon atoms of the ring represent methylenedioxy;
$n$ and $m$ independently represent 0–2.

The terms $C_1$-$C_3$ alkyl and $C_1$-$C_3$ alkoxy refer to groups such as methyl, ethyl, propyl, ethoxy, and isopropoxy.

It will be understood by those skilled in the organic chemical art that, when n or m in the above formula represents 2, the two $R^2$ or $R^3$ groups which are present need not be the same.

The following specific compounds, which are exemplary but by no means exhaustive of the compounds of my invention, are offered in order to assure that those skilled in the organic chemical art understand the scope of my invention.

2,3-methylenedioxycinnamoyl chloride, phenylhydrazone 3,4-dimethylcinnamoyl chloride, phenylhydrazone 2-ethylcinnamoyl chloride, 3-methoxyphenylhydrazone 2-ethyoxy-4-methylcinnamoyl chloride, 2-chlorophenylhydrazone 2,3-dichlorocinnamoyl chloride, 3,5-diethylphenylhydrazone 3,4-methylenedioxycinnamoyl chloride, 4-iodophenylhydrazone 2-chloro-4-propylcinnamoyl chloride, 3,4-methylenedioxyphenylhydrazone 4-iodocinnamoyl chloride, 3-trifluoromethylphenylhydrazone 3-bromo-4-methoxycinnamoyl chloride, 2,6-dibromophenylhydrazone 3-trifluoromethylcinnamoyl chloride, 4-isopropylphenylhydrazone 5-methoxy-3-trifluoromethylcinnamoyl chloride, 3-propoxyphenylhydrazone.

3-propylcinnamoyl chloride, 3-cyano-5-methylphenylhydrazone 4-cyanocinnamoyl chloride, 4-cyanophenylhydrazone cinnamoyl chloride, 3-ethoxy-4-methylphenylhydrazone 4-bromo-3-methylcinnamoyl chloride, phenylhdyrazone 4-isopropoxycinnamoyl chloride, 2,4-dichlorophenylhydrazone cinnamoyl chloride, 4-chloro-3-ethylphenylhydrazone 4-methylcinnamoyl chloride, phenylhydrazone 3-nitrocinnamoyl chloride, phenylhydrazone 5-ethoxy-3-nitrocinnamoyl chloride, 3,4-methylenedioxyphenylhydrazone 3,5-dinitrocinnamoyl chloride, phenylhydrazone 4-chloro-3-cyanocinnamoyl chloride, phenylhydrazone cinnamoyl chloride, 2,4-dimethoxyphenylhydrazone 3-nitrocinnamoyl chloride, 5-chloro-3-trifluoromethylphenylhydrazone 3-methyl-2-thiopheneacryloyl chloride, 3,5-ditrifluoromethylphenylhydrazone 4-ethoxy-2-thiopheneacryloyl chloride, phenylhydrazone 3-chloro-2-thiopheneacryloyl chloride, phenylhydrazone 5-trifluoromethyl-3-thiopheneacryloyl chloride, 3,5-dicyanophenylhydrazone 3-nitro-2-thiopheneacryloyl chloride, 2-bromo-5-trifluoromethylphenylhydrazone 4-cyano-3-thiopheneacryloyl chloride, 3-cyano-5-methoxyphenylhydrazone 3,4-methylenedioxy-2-thiopheneacryloyl chloride, 2-bromo-4-ethoxyphenylhydrazone 4-bromo-2-methyl-3-thiopheneacryloyl chloride, phenylhydrazone The following compounds are the preferred species of my invention.

cinnamoyl chloride, phenylhydrazone 2-thiopheneacryloyl chloride, phenylhydrazone cinnamoyl chloride, 4-methoxyphenylhydrazone 3-methoxycinnamoyl chloride, phenylhydrazone 4-methylcinnamoyl chloride, phenylhydrazone I have also invented a method of treating helminthiasis in domestic and companion animals infected with helminths which comprises administering to the animal an anthelminitically-effective amount of one of the compounds described above. Further, I have invented useful anthelmintic compositions which comprise a physiologically-acceptable carrier and one of the compounds just described.

The best methods of administering my anthelmintic phenylhydrazones to animals and the best methods of formulating my anthelmintic compositions will be described below.

My novel anthelmintic compounds are made by the following general methods of synthesis, which are methods known to the organic chemical art. The synthesis proceeds in two steps. In the first step, an appropriately-substituted cinnamoyl chloride, or a thiopheneacryloyl chloride, is reacted with an appropriately-substituted phenylhydrazine. That reaction proceeds in pyridine at reflux temperature, and the intermediate product, the cinnamoyl or thiopheneacryloyl phenylhydrazide, is recovered by merely quenching the reaction mixture, acidifying and filtering.

The second step of the synthesis is the formation of the final product by reacting the first step product with $PCl_5$ in refluxing benzene. The reaction mixture is then cooled, three molar parts of phenol is added, and the mixture is stirred at room temperature. The desired product is recovered by merely evaporating off the volatiles under vacuum.

All the compounds which are starting materials for my compounds are obtainable or may be made by methods known to the art. The cinnamoyl and thiopheneacryloyl chlorides are made by refluxing the acid with $SOCl_2$ and a trace of dimethylformamide in benzene. The crude acid chloride is used as the starting material in the first step of my synthesis without purification.

The preparative examples which follow will further clarify the synthesis of my compounds. The first example illustrates the first stage of the synthesis.

EXAMPLE 1 cinnamoyl phenylhydrazide

To 21.6 g. of phenylhydrazine in 100 ml. of pyridine was added 33.4 g. of cinnamoyl chloride in 50 ml. of benzene. The reaction mixture was heated to reflux and stirred at that temperature for 24 hours. The mixture was then poured over ice, acidified with 6N HCl and filtered to separate the crude product, which was recrystallized from aqueous ethanol. The recrystallized product was identified by NMR as 32.1 g. of cinnamoyl phenylhydrazide, m.p. 189°–190°C.

The following example illustrates the second stage of the synthesis.

EXAMPLE 2 cinnamoyl chloride, phenylhydrazone

A 23.8 g. portion of cinnamoyl phenylhydrazide was suspended in 250 ml. of benzene, 20.8 g. of phosphorus pentachloride was added, and the mixture was refluxed for 24 hours. Then the reaction mixture was cooled, 28.2 g. of phenol in 50 ml. of benzene was added, and the mixture was stirred at room temperature for 24 hours. The mixture was then evaporated under vacuum to a solid residue. The residue was recrystallized from ethanol to produce 8.6 g. of product, which was identified by NMR analysis as cinnamoyl chloride, phenylhydrazone, m.p. 143°–145°C.

All of my other compounds are produced by methods analogous to those of the above examples. For example, the following compounds are produced by the above methods, with minor changes in the process which are readily supplied by one skilled in the organic chemical art.

3-chlorocinnamoyl chloride, phenylhydrazone, m.p. 90°–91°C.

3-nitrocinnamoyl chloride, phenylhydrazone, m.p. 125°–127°C.

4-methylcinnamoyl chloride, phenylhydrazone, m.p. 170°–171°C.

4-chlorocinnamoyl chloride, phenylhydrazone, m.p. 153°–156°C.

4-methoxycinnamoyl chloride, phenylhydrazone, m.p. 130°–131°C.

3,4-methylenedioxycinnamoyl chloride, phenylhydrazone, m.p. 139°–141°C.

3-methoxycinnamoyl chloride, phenylhydrazone, m.p. 70°–71°C.

cinnamoyl chloride, 4-chlorophenylhydrazone, m.p. 149°–150°C.

cinnamoyl chloride, 4-methoxyphenylhydrazone, m.p. 136–138°C.

4-methoxycinnamoyl chloride, 4-chlorophenylhydrazone, m.p. 143°–144°C.

thiopheneacryloyl chloride, phenylhydrazone, m.p. 131°–134°C.

My new compounds are useful for the treatment of helminthiasis in domestic and companion animals. The data below shows that my compounds are effective in treating domestic and companion animals infected with a variety of species of helminths. The fraction of the helminths inhabiting the treated animal which are killed or eliminated from the animal depends on the hardiness of the species of helminth and the amount of the compound with which the host animal is treated.

I have proved the effectiveness of my anthelmintic compounds by scientific tests. The first test which I applied was an in vitro test against *Haemonchus contortus* larvae. The test was conducted by treating about 100 third-stage, exsheathed *H. contortus* larvae with approximately 0.1 mg. of the test compound in 1 ml. of physiological buffered saline. The treated and control larvae were placed in a chamber controlled at 37°–38°C. After 18 hours, the larvae were observed for movement. Compounds were rated on a scale of 0–4 with 0 indicating excellent activity, that is, little or no movement of the larvae. A rating of 1 or 2 indicates some activity; a rating of 3 or 4 designates an inactive compound which allowed normal or essentially normal worm movement.

The table below shows the results of conducting the *H. contortus* test with a number of my compounds.

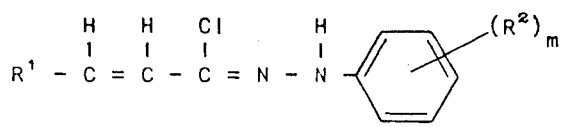

| $R^1$ | $R^2$ | Result |
|---|---|---|
| phenyl | none | 1 |
| 3-chlorophenyl | none | 1 |
| 3-nitrophenyl | none | 2 |
| p-tolyl | none | 1 |
| 4-chlorophenyl | none | 1 |
| p-anisolyl | none | 0 |
| 3,4-methylenedioxyphenyl | none | 1 |
| phenyl | 4-chloro | 1 |
| p-anisolyl | 4-chloro | 1 |
| 2-thienyl | none | 1 |
| phenyl | 4-methoxy | 1 |

Another test applied to my compounds was a test for activity against *Nematospiroides dubius* and *Ascaris suum* in mice. Two infected white male mice weighing about 25 g. were used for each compound. The compound was administered in one-half ml. of water by oral gavage at a dose level of 500 mg./kg. of body weight. Six infected animals were kept as untreated controls for each group of 48 treated mice. After treatment, the mice were housed in wire cages for approximately 72 hours, when they were sacrificed and necropsied.

The number of *N. dubius* worms present was determined at necropsy by excising the first 10 to 12 inches of the small intestine, pressing the intestine between two clear glass plates, and viewing the intestine over a lighted view plate. The worms retained were counted and compared to the average number of worms retained by the untreated controls.

To determine the activity of the tested compound against *A. suum*, the cecum was removed, pressed between glass plates, and observed in the same manner as was the small intestine. Worm burdens were observed and compared to worm burdens of untreated controls. The compounds were recorded as active or inactive against each worm species. The following table reports the observed results in mouse testing of examples of my compounds.

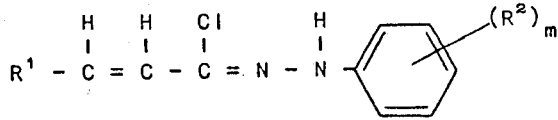

| $R^1$ | $R^2$ | Result |
|---|---|---|
| 4-chlorophenyl | none | active (*N. dubius*) |
| p-anisolyl | none | active (*N. dubius*) |
| 2-thienyl | none | active (*N. dubius*) |
| 3,4-methylenedioxyphenyl | none | active (*A. suum*) |
| phenyl | 4-methoxy | active (*A. suum*) |

After testing my compounds in mice, I proceeded to test a number of them in sheep. Lambs naturally infected with helminths were used for these tests. Therefore, it was not possible to predict in advance what helminths would actually be present in a given group of treated lambs. The lambs were placed in individual cages and allowed to adjust to their surroundings for several days before treatment. The test compounds were adminstered in a single oral dose contained in a gelatin capsule at a rate of from 50 to 100 mg./kg. of body weight. A nontreated lamb served as a control for each treatment group. The animals were provided with normal feed and water after treatment.

The feces were collected from each animal twice daily for 3 days after treatment and examined for passed helminths. After 3 days, the animal was sacrificed and its gastrointestinal tract was examined for helminths. Efficacy of the compound was determined by the percent removal of helminths from the treated animal. Control lambs were observed for natural worm passage and were sacrificed only if significant natural worm passage occurred.

The results of testing a representative number of my compounds in lambs are reported below. The results are reported as the percent removal of worms from the treated animal at the stated treatment dose. Dashes in the table indicate that no helminths of the genus were present.

The compounds for which results will be reported were the following.

| Compound No. | Compound |
| --- | --- |
| 1 | 4-methylcinnamoyl chloride, phenylhydrazone |
| 2 | 3,4-methylenedioxycinnamoyl chloride, phenylhydrazone |
| 3 | cinnamoyl chloride, 4-chlorophenylhydrazone |
| 4 | 3-chlorocinnamoyl chloride, phenylhydrazone |
| 5 | 4-methoxycinnamoyl chloride, phenylhydrazone |
| 6 | 4-chlorocinnamoyl chloride, phenylhydrazone |
| 7 | 2-thiopheneacryloyl chloride, phenylhydrazone |
| 8 | cinnamoyl chloride, phenylhydrazone |
| 9 | cinnamoyl chloride, 4-methoxyphenylhydrazone |
| 10 | 3-methoxycinnamoyl chloride, phenylhydrazone |

The table below shows the dose given the lamb in milligrams per kilogram of body weight, and the percent of six genera of helminths which were removed from the animal by the treatment. The abbreviations in the table have the following meanings.

Coop. = Cooperia
Buno. = Bunostonum
Oeso. = Oesophagostomum

| No. | Dose | Haemonchus | Trichostrongylus | Nematodirus | Coop. | Buno. | Oeso. |
| --- | --- | --- | --- | --- | --- | --- | --- |
| 1 | 100 | 91% | 19% | 100% | 100% | 100% | — |
| 2 | 50 | 100 | 0 | 100 | 100 | — | — |
| 3 | 50 | 76 | 0 | 85 | 52 | — | — |
| 4 | 50 | 100 | 36 | 100 | — | — | 100% |
| 5 | 50 | 26 | 66 | 100 | 100 | — | 100 |
| 6 | 50 | — | 67 | 100 | — | — | 100 |
| 7 | 100 | 100 | 72 | 100 | — | — | — |
| 8 | 100 | 100 | 89 | 100 | 100 | — | 100 |
| 9 | 50 | 100 | 100 | 100 | — | — | — |
| 10 | 50 | 100 | 100 | 100 | — | — | — |

The above data shows clearly that my phenylhydrazones are effective in treating helminthiasis caused by a number of different helminths. Each compound is effective against most species of helminths present, and in many instances all of the helminths of a species were eradicated.

My novel phenylhydrazones are effective antibacterials and fungicides as well as anthelmintics. I have found that my compounds are effective in the control of bacteria such as *Xanthomonas sp.*, and against fungi of genera such as *Candida*, *Trichophyton*, *Botrytis*, *Ceratocystis*, *Fusarium* and *Verticillium*.

For example, 3-nitrocinnamoyl chloride, phenylhydrazone prevents the growth of the following organisms at the named concentration of the phenylhydrazone compound.

| Organism | Concentration |
| --- | --- |
| *Xanthomonas phaseoli* | 100 mcg./ml. |
| *Candida tropicalis* | 100 mcg./ml. |
| *Trichophyton mentagrophytes* | <10 mcg./ml. |
| *Botrytis cinerea* | <10 mcg./ml. |
| *Ceratocystis ulmi* | <10 mcg./ml. |
| *Fusarium oxysporum* | <10 mcg./ml. |
| *Verticillium albo-atrum* | 100 mcg./ml. |

Those skilled in the veterinary medical art will understand that my new anthelmintic compounds are effective in treating helminthiasis of other domestic and companion animals besides sheep. For example, it will be clear to such skilled persons that my anthelmintic phenylhydrazones are effective in ruminants such as cattle, in monogastric domestic animals such as horses and swine, in domestic poultry such as chickens, and in monogastric companion animals such as cats and dogs.

Those skilled in the art will also recognize that my new compounds are effective in treating helminthiasis caused by a large number of different helminths. For example, helminthiasis caused by infection by the following helminths of the named domestic and companion host animals will be treated by the administration of my compounds.

| Horses | *Strongylus sp.* |
| --- | --- |
| | *Parascaris equorum* |
| | *Trichostrongylus axei* |
| | *Oxyuris equi* |
| Dogs | *Toxocara canis* |
| | *Toxascaris leonina* |
| | *Ancylostoma caninum* |
| | *Uncinaria stenocephala* |
| | *Dipylidium caninum* |
| | *Taenia sp.* |
| Cats | *Toxocara cati* |
| | *Toxascaris leonina* |
| | *Ancylostoma tubaeformes* |
| | *Dipylidium caninum* |
| | *Taenia taeniaformis* |
| Sheep | *Haemonchus contortus* |
| | *Monieza expansa* |
| | *Trichostrongylus sp.* |

-Continued

| | |
|---|---|
| Cattle | Nematodirus sp.<br>Cooperia sp.<br>Oesophagostomum sp.<br>Bunostomum trigonocephalum<br>Ostertagia sp.<br>Chabertia ovina<br>Haemonchus contortus<br>Ostertagia ostertagia<br>Trichostrongylus sp.<br>Nematodirus sp.<br>Cooperia sp.<br>Bunostomum phlebotomum<br>Oesophagostomum radiatum<br>Moniezia expansa |
| Swine | Oesophagostomum sp.<br>Ascaris suum |
| Chickens | Ascaridia galli<br>Heterakis gallinarum |

In order to accomplish treatment for helminthiasis, the animal to be treated must receive at least an effective amount of the anthelmintic compound. The effective amount for the treatment of helminthiasis caused by a given helminth in a given host animal depends upon the severity of the infection, upon the host animal, upon the individual phenylhydrazone compound chosen, and upon the hardiness of the helminth. Further, it is clearly necessary to use an amount of compound less than the toxic amount of that compound in the host species. In general, ruminant animals can be treated with effective amounts lower than the amounts necessary in monogastric animals. For example, the effective amount in sheep under certain conditions is only 15 mg. of compound per kilogram of host animal body weight. Under most conditions, host animals may be treated for helminthiasis with my compounds with effective amounts from about 25 mg./kg. to about 200 mg./kg. In some instances, however, when a particularly resistant helminth is to be eliminated from a particularly badly-infected host, it may be necessary to use as much as 500 mg./kg.

My anthelminthic compounds may be administered for the treatment of helminthiasis at any time. It is most economically desirable to administer the anthelmintic as soon as the animals are infected, in order to reduce the length of time during which the animals are injured by helminthiasis. However, my compounds will be effective in killing or eliminating helminths from the treated animal even though the animal is heavily infected when treatment is begun.

The time of administration is related to the effective amount of the compound which must be used. If treatment is not initiated until very extensive infection has taken place, then a heavy dose of the compound must be administered.

The usual and preferred method of administration of my compounds is by means of a single dose, which is administered in a sufficient effective amount to reduce the infection to an innocuous level. However, repeated doses spaced a few days apart are also effective and may be a preferable method of administration when the animal to be treated is so weak that it cannot tolerate a normal effective dose of the compound.

Anthelmintic compositions of my compounds comprise the anthelmintic phenylhydrazone compounds combined with physiologically-acceptable carriers. The anthelmintic compositions containing my compounds, and the carriers from which those compositions are made, are of the types conventional in the veterinary pharmaceutical art. My compositions are unique and novel because of the presence of my novel effective anthelmintic compounds. In order to be sure that all may obtain the benefit of my compounds however, some explanation of the formulation of anthelmintic compositions will be given.

Oral administration of my compounds is preferred. For oral administration, the compounds may be formulated in compositions such as boluses, tablets, drenches, or capsules. My anthelmintic compounds may also be administered percutaneously, as by injection. Injectable pharmaceuticals may be in the form of either suspensions or solutions, or may be formulated as slow-releasing depot compositions.

Effective injectable compositions containing my compounds may be in either suspension or solution form. The veterinary pharmaceutical art is well aware of many effective methods of making both suspension and solution injectables. Solutions comprise the active compound dissolved in a physiologically acceptable carrier comprising a solvent together with the necessary preservatives, such as benzyl alcohol, and buffers. Useful solvents may be, depending on the compound chosen, alcohols, glycols, or inert oils such as vegetable oils or highly-refined mineral oil.

Injectable suspension compositions employ a nonsolvent for the phenylhydrazone, with adjuvants, as a carrier. The nonsolvent can be for example, depending upon the particular compound chosen, a vegetable oil such as peanut oil, corn oil, or sesame oil, a glycol such as one of the polyethylene glycols, or water.

Suitable physiologically-acceptable adjuvants are necessary to keep the active compounds suspended in a suspension composition. The adjuvants may be chosen from among the thickeners, such as carboxymethylcellulose, polyvinylpyrrolidone, gelatin, and the alginates. Many classes of surfactants also serve to suspend the phenylhydrazones. For example, lecithin, alkylphenol polyethylene oxide adducts, naphthalenesulfonates, alkylbenzenesulfonates, and the polyoxyethylene sorbitan esters are useful for suspending my compounds in liquid nonsolvents.

Many substances which affect the hydrophilicity, density, and surface tension of the liquid nonsolvent can assist in making injectable suspensions in individual cases. For example, silicone anti-foams, glycols, sorbitol, and sugars can be useful suspending agents.

My anthelmintic compounds may usefully be formulated as slow-releasing percutaneous compositions. Such compositions, well known in the veterinary pharmaceutical art, allow a single percutaneous administration of the compound to provide continuous dosing of the compound to the animal for a period of time which may be controlled by the characteristics of the composition. For example, one of my compounds may be given sustained action by formulating the compound in a matrix composition which will physically inhibit dissolution of the compound. The matrix composition is administered to the animal to be treated by injection into a body part where it remains as a depot. Such matrix compositions can be formulated in waxy, hydrophobic semisolids such as vegetable waxes and high-molecular-weight polyethylene glycols.

Compositions for oral administration of my anthelmintic compounds may be in any of the oral pharmaceutical dosage forms, such as tablets, capsules, boluses, and drenches. Most conveniently, my compounds may be formulated as drenches. The usual veterinary drench is formulated as a solid particulate composition which is suspended in water to prepare the drench. Such a composition includes the phenylhydrazone and a carrier comprising a suspending agent, a dispersing agent, a wetting agent, an anti-caking agent, and a diluent. For example, 100 g. of a suspendable drench composition might contain 72.6 g. of phenylhydrazone, from 2 to 5 g. each of the suspending agent, dispersing agent, wetting agent, and anti-caking agent, and diluent to make 100 g. total.

Various surface-active agents are used as the suspending agent, dispersing agent, and wetting agent in a drench composition. For example, the suspending agent can be an ethylene oxide adduct of an alkyl phenol such as the 12-mole ethylene oxide adduct of nonylphenol, or it can be an anionic surface-active agent such as sodium N-methyl-N-oleoyl taurate. The dispersing agent may be a salt of dodecylbenzenesulfonic or naphthalenesulfonic acid. Effective wetting agents for such preparations include alkali salts of lignin sulfonic acids. An anti-caking agent which is widely used in drench compositions is fumed silica, while bentonite is a widely-used diluent.

Anthelmintic capsules of my phenylhydrazones are prepared by merely filling the desired dose of the anthelmintic compound in a conventional pharmaceutical capsule. Appropriate diluents, such as lactose or starch, may be used as a carrier in order to increase the bulk of the dose to fill the desired size capsule.

Boluses or tablet compositions of my compounds are prepared according to the extremely well-known pharmaceutical art of tablet-making. The active compound is mixed with a carrier comprising a diluent, a binder, and a lubricant, and the mixture is compressed into tablet form. Typical binders include lactose, starch, and microcrystalline cellulose. Various vegetable and artificial gums are also effective binders as is well known. Stearic acid and magnesium stearate are typical lubricants.

Tablets and boluses may be coated with enteric coatings which allow the composition to pass through the rumen and release the anthelmintic compound in the abomasum of a ruminant animal. A similar composition, administered to a monogastric animal, passes unaffected through the stomach and releases the anthelmintic compound in the animal's intestine. Such enteric-coated compositions may be very useful in instances when the phenylhydrazone compound is irritating to the rumen or stomach, or is unstable in the rumen or stomach.

Sustained-acting tablets and boluses may be prepared for administration to ruminant animals. Such compositions, which are always large and of high density, remain in the rumen of the animal and release the anthelmintic phenylhydrazone over a period of time controlled by the amount and dissolution rate of the matrix which is the physiologically acceptable carrier of the composition. Thus, a single oral dose may be used to administer anthelmintic treatment over a desired period. The formulation of such compositions is well known in the veterinary pharmaceutical art; the compositions are made in the same manner that normal tablets and boluses are made, with the addition of a matrix similar to those described under depot injectable compositions.

My anthelmintic compounds may also be formulated as a gel or paste which can readily be placed in the animal's mouth. In such a composition, the phenylhydrazone is combined with a suspending agent, a solvent, a preservative, and a diluent. Effective suspending agents include methylcellulose, carboxymethylcellulose, and tragacanth. Glycerin and propylene glycol are useful solvents. Preservatives which may be used in these compositions, as well as in other compositions, include sodium borate, methyl or propyl p-hydroxybenzoate, and benzyl alcohol. The diluent is usually water. In a typical composition, the phenylhydrazone will comprise about 5 percent by weight, the suspending agent 20 percent, the organic solvent 10 percent, the preservative 2 percent, and the diluent 63 percent.

My compounds may also be orally administered in the drinking water or feed of the animals to be treated for helminthiasis. Administration in drinking water is accomplished by mixing the proper amount of the desired phenylhydrazone into the amount of water which the animal to be treated consumes in a day. Most conveniently, a suspendable composition such as was described for use as a drench is prepared and mixed into the drinking water.

The formulation of veterinary pharmaceuticals in feed is an extremely well-known art. Usually my phenylhydrazone is formulated first as a premix in which the compound is dispersed in a liquid or particulate physiologically acceptable carrier. The premix may conveniently contain from about 1 to about 400 g. of drug per pound, depending on the concentrations desired in the feed. The premix is formulated into feed by being dispersed in the feed in a conventional mixer. Typical physiologically-acceptable carriers for premixes include dehydrated alfalfa or soybean meal, vermiculite, and polyethylene glycol.

It is usual to administer drugs to animals in combinations. Such combination administration is desirable because of the many types of growth-promoters, anthelmintics, and antimicrobials which may desirably be administered to animals for economic reasons. My anthelmintic phenylhydrazones will be found to be effective when administered in such combinations, and such combination administration is included within the scope of my invention.

The best methods of using my novel compounds as bactericides and fungicides are the conventional methods in those arts.

When my compounds are to be used as bactericides and fungicides for the treatment of diseases of animals, they are formulated for administration to the animals in any of the methods which have been discussed for the administration of my compounds as anthelmintics. My compounds may also be administered for such use in the form of ointments to be applied to the skin.

My new phenylhydrazones may also be used as additives to cleaning mixtures for the control of bacteria and fungi on inert surfaces such as walls and floors. When used in that way, my compounds are combined with conventional cleaning mixtures containing detergents, emulsifiers, and inorganic cleaning agents such as phosphate salts.

My compounds are also usefully employed as fungicides and bactericides for plant protection. The best compositions of my phenylhydrazones for application to affected plants are prepared according to methods well known in the agricultural chemicals art. The compounds may be applied to the affected plants dispersed in water, as dusts, and as solutions. When the compounds are to be applied as aqueous dispersions, it is usual to make either a solid concentrated composition known as a wettable powder, or a liquid concentrated solution in a water-immiscible organic solvent which is known as an emulsifiable concentrate. Fungicidal dusts are prepared by dispersing the finely ground fungicidal compound in a finely ground inert carrier such as a ground clay.

I claim:

1. An anthelmintic composition which comprises a physiologically-acceptable carrier and an anthelmintically effective amount of a compound of the formula

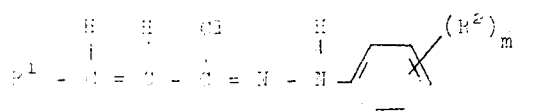

wherein
R¹ represents

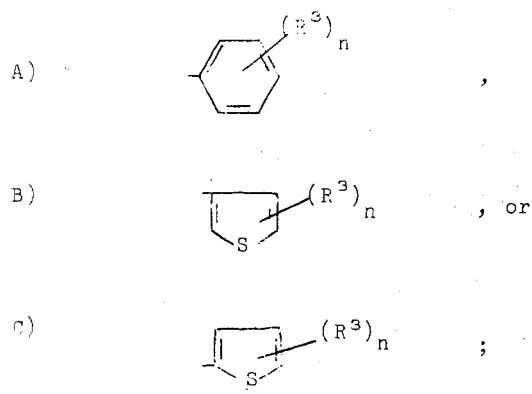

R² represents
  A. $C_1$-$C_3$ alkyl,
  B. $C_1$-$C_3$ alkoxy,
  C. chloro,
  D. bromo,
  E. iodo,
  F. trifluoromethyl,
  G. cyano, or
  H. two R² groups attached to adjacent carbon atoms of the phenyl ring represent methylenedioxy;
R³ represents
  A. $C_1$-$C_3$ alkyl,
  B. $C_1$-$C_3$ alkoxy,
  C. chloro,
  D. bromo,
  E. iodo,
  F. trifluoromethyl,
  G. cyano,
  H. nitro, or
  I. two R³ groups attached to adjacent carbon atoms of the ring represent methylenedioxy; and
n and m independently represent 0-2.

2. The composition of claim 1 in which the compound is cinnamoyl chloride, phenylhydrazone.

3. The composition of claim 1 in which the compound is 2-thiopheneacryloyl chloride, phenylhydrazone.

4. The composition of claim 1 in which the compound is cinnamoyl chloride 4-methoxyphenylhydrazone.

5. The composition of claim 1 in which the compound is 3-methoxycinnamoyl chloride, phenylhydrazone.

6. The composition of claim 1 in which the compound is 4-methylcinnamoyl chloride, phenylhydrazone.

7. A method of treating helminthiasis in domestic animals infected with helminths which comprises administering to the animal an anthlminticallyeffective amount of a compound of the formula

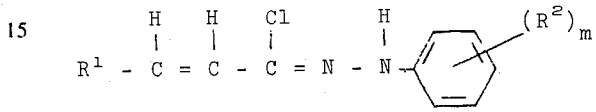

wherein
R¹ represents

A) 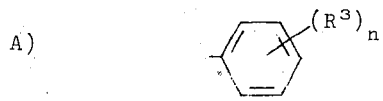

B) 

C) 

R² represents
  A. $C_1$-$C_3$ alkyl,
  B. $C_1$-$C_3$ alkoxy,
  C. chloro,
  D. bromo,
  E. iodo,
  F. trifluoromethyl,
  G. cyano, or
  H. two R² groups attached to adjacent carbon atoms of the phenyl ring represent methylenedioxy;
R³ represents
  A. $C_1$-$C_3$ alkyl,
  B. $C_1$-$C_3$ alkoxy,
  C. chloro,
  D. bromo,
  E. iodo,
  F. trifluoromethyl,
  G. cyano,
  H. nitro, or
  I. two R³ groups attached to adjacent carbon atoms of the ring represent methylenedioxy; and
n and m independently represent 0-2.

8. The method of claim 7 in which the compound is cinnamoyl chloride, phenylhydrazone.

9. The method of claim 7 in which the compound is 2-thiopheneacryloyl chloride, phenylhydrazone.

10. The method of claim 7 in which the compound is cinnamoyl chloride, 4-methoxyphenylhydrazone.

11. The method of claim 7 in which the compound is 3-methoxycinnamoyl chloride, phenylhydrazone.

12. The method of claim 7 in which the compound is 4-methylcinnamoyl chloride, phenylhydrazone.

* * * * *

UNITED STATES PATENT AND TRADEMARK OFFICE
CERTIFICATE OF CORRECTION

PATENT NO. : 3,897,559
DATED : July 29, 1975
INVENTOR(S) : Henry Friedman

It is certified that error appears in the above-identified patent and that said Letters Patent are hereby corrected as shown below:

Column 6, line 20, "25 g." should read --26 g.--.

Column 13, drawing at line 15 should read as follows:

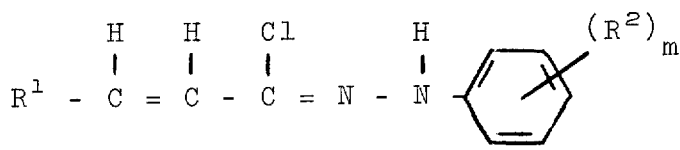

Column 13, drawing at line 25 should read as follows:

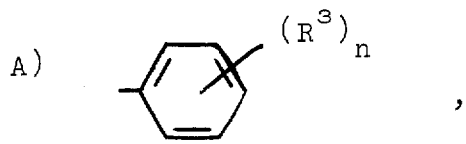

,

Signed and Sealed this ninth Day of December 1975

[SEAL]

Attest:

RUTH C. MASON
Attesting Officer

C. MARSHALL DANN
Commissioner of Patents and Trademarks